2 Sheets—Sheet 1.

H. AIKEN, F. W. WOOD & H. H. CAMPBELL.

OPEN HEARTH FURNACE.

No. 11,572. Reissued Oct. 13, 1896.

2 Sheets—Sheet 2.

H. AIKEN, F. W. WOOD & H. H. CAMPBELL.

OPEN HEARTH FURNACE.

No. 11,572. Reissued Oct. 13, 1896.

WITNESSES

W. M. Corum

Warren W. Swartz

INVENTORS

Henry Aiken

F. W. Wood

H. H. Campbell by Bakewell & Bakewell their attys.

UNITED STATES PATENT OFFICE.

HENRY AIKEN, OF PITTSBURG, PENNSYLVANIA, FREDERICK W. WOOD, OF BALTIMORE, MARYLAND, AND HARRY H. CAMPBELL, OF STEELTON, PENNSYLVANIA.

OPEN-HEARTH FURNACE.

SPECIFICATION forming part of Reissued Letters Patent No. 11,572, dated October 13, 1896.

Original No. 481,885, dated August 30, 1892. Application for reissue filed September 5, 1896. Serial No. 605,043.

*To all whom it may concern:*

Be it known that we, HENRY AIKEN, of Pittsburg, Allegheny county, Pennsylvania, FREDERICK W. WOOD, of Baltimore, Maryland, and HARRY H. CAMPBELL, of Steelton, in the county of Dauphin and State of Pennsylvania, have invented a new and useful Improvement in Open-Hearth Furnaces, of which the following is a full, clear, and exact description, reference being had to the accompanying drawings, in which—

Figure 1:
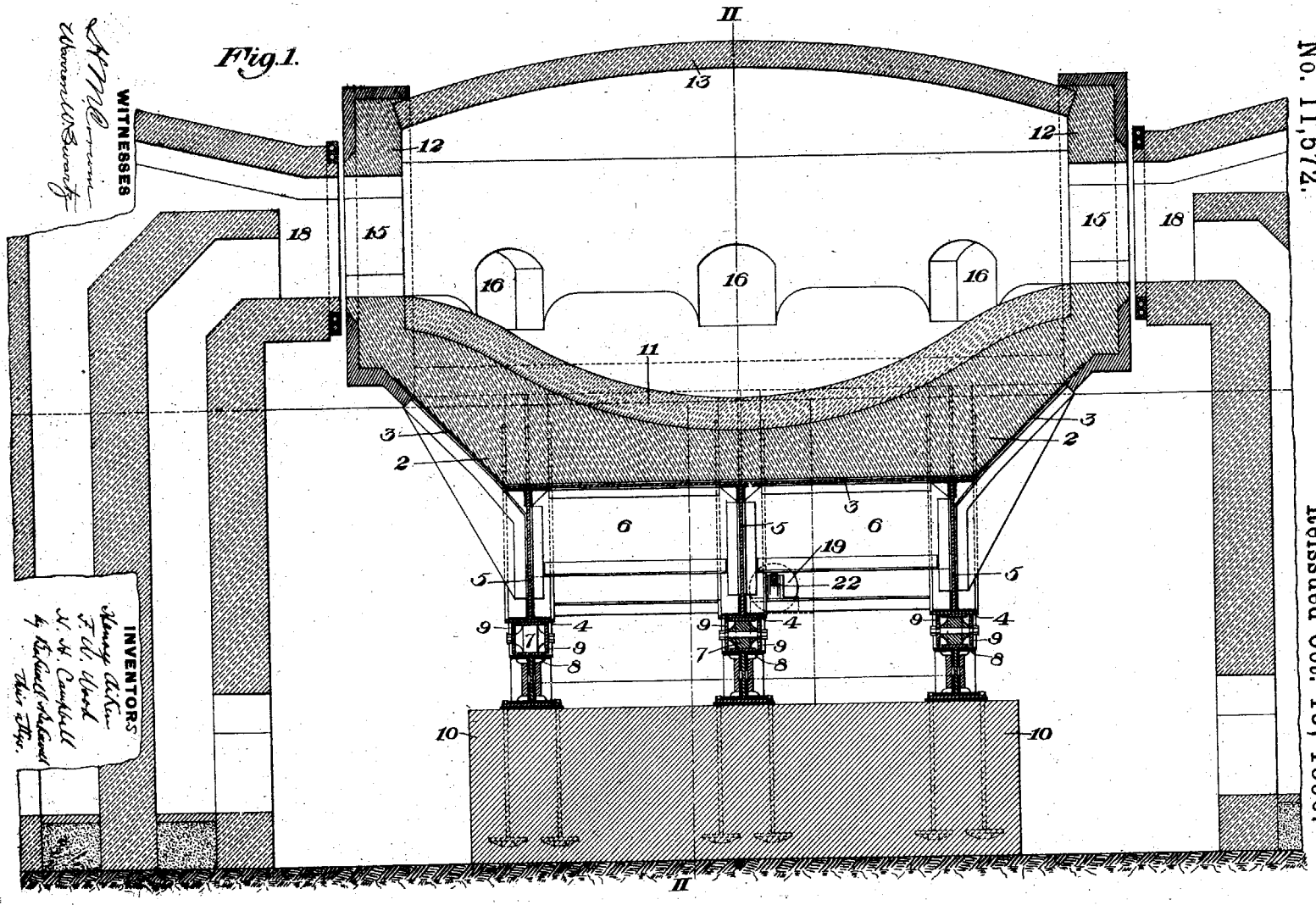
Figure 2:
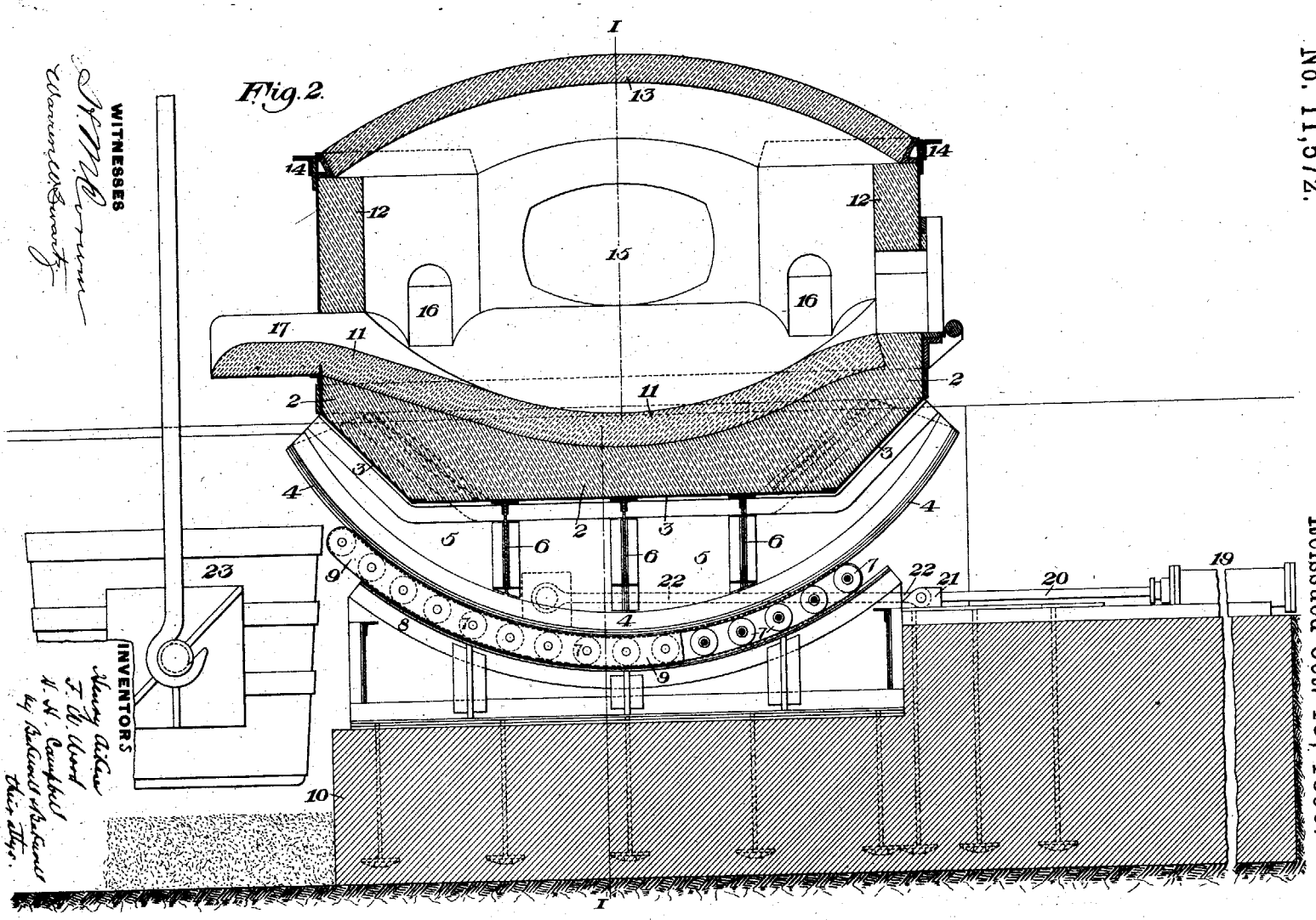

Figure 1 is a longitudinal section of the furnace on the line I I of Fig. 2. Fig. 2 is a cross-section on the line II II of Fig. 1.

Our invention consists in a furnace of improved construction set upon rockers and adapted to be tipped for the purpose of pouring the slag and metal. It is especially applicable to open-hearth furnaces, and its use results in a great saving of labor and time as compared with furnaces ordinarily used. The furnace is simple in construction, is strong, is operated with safety, and is efficient in performing the work for which it is designed. Its advantages as compared with prior constructions will be appreciated by those skilled in the art.

In the drawings, 2 represents the hearth of an open-hearth furnace, which is built upon a metal framework of plates 3 and curved parallel rocker-bars 4, which are secured to the plates 3 by vertical webs 5 and bracing-plates 6. We show in the drawings three of these rocker-bars placed suitable distances apart. When the furnace is in position for use, the rocker-bars rest upon series of movable antifriction-rollers 7, which are set between the lateral confining-plates 9, to which the rollers are journaled and which connect the same in tandem. The rollers thus connected by the plates 9 (which are not connected to the furnace) ride upon curved rails 8, constituting a supporting-cradle, the rails 8 being supported on a foundation 10, as shown. These rollers are therefore not journaled in stationary bearings, but are capable of traveling somewhat on the rails 8 when the furnace is tipped, as hereinafter described. The hearth 2 is provided with a suitable lining 11, and upon the hearth are built the furnace-walls 12, surmounted by a roof 13, the walls being preferably incased in a metallic jacket and the roof being provided with a marginal inclosing frame 14, which is secured to the walls. On opposite sides of the furnace are ports 15 for the admission and exit of the heating-gases and charging-doors 16. At the end of the furnace, toward which it is oscillatory, is an opening provided with a spout 17, which is suitably lined to resist the action of the molten metal and slag.

The purpose of setting the furnace on rockers in the manner above described is to permit it to be oscillated with a limited range of movement, and the curvature of the rockers is such that the center of oscillation shall be about the middle of the opposite ports 15. The furnace is so set, as shown in Fig. 1, that said ports shall be directly opposite and adjacent to the ends of flues 18, which lead from and to the regenerators from which gas and air are admitted and to which the products of combustion are passed with a reversing action in the manner common in operating open-hearth furnaces. By thus having the center of oscillation opposite these flues the connection of the furnace with the regenerators is preserved in every position. The materials of the furnace are so disposed, as shown in the drawings, that the center of gravity shall be below the center of oscillation. This is an important factor of safety, and the result is that if the tipping mechanism of the furnace should break or get out of order the furnace will not tend to upset, but will of itself assume or remain in a stable position.

In order to tip the furnace, we prefer to employ the mechanism shown in Fig. 2. This consists of a hydraulic cylinder 19, whose plunger 20 is provided with a cross-head 21, connected by a link or links 22 with the rocker-frame of the furnace, so that by moving said plunger longitudinally the furnace may be tipped on its rockers within a limited arc, and thus caused to discharge the molten slag or metal from the hearth.

The construction of apparatus which we have shown and described is for many reasons desirable on account of its simplicity and durability of construction and the ease with which it can be operated, but within the scope of the claims changes may be made in the construction and arrangement of the parts without variance from our invention.

The operation of the apparatus when used in the manufacture of open-hearth steel by the basic process may be as follows: The furnace being in the horizontal position illustrated in the drawings and being properly heated is charged with metal, and the operations of the basic process are carried on in the usual way. Near the end of the operation basic material—such as limestone, dolomite, &c.—is introduced into the furnace and forms a slag which acts in dephosphorizing the metal. As soon as this dephosphorization has proceeded to the finish instead of rabbling out the slag, as heretofore, we tip the furnace on its rockers by means of the cylinder 19, and thereby discharge the slag through the spout 17 into a ladle 23, placed beneath the spout to receive the same. The furnace may then be restored to its horizontal position, the heating action is kept up as long as required, and then in order to discharge the metal the furnace is again tipped and the metal poured out through the spout. It should be understood, however, that, if desired, the metal may be withdrawn immediately after pouring the slag.

The use of the antifriction-rollers in connection with the rockers is a valuable feature of the apparatus in that it affords a very strong and safe means for supporting the furnace and affords little friction to resist the tipping action of the cylinder.

We claim—

1. A metallurgical furnace having rockers on which it can be tipped, a supporting-cradle, traveling antifriction-rollers between the rockers and cradle, and a discharging-spout at the end of the furnace toward which it is oscillatory substantially as and for the purposes described.

2. A metallurgical furnace having rockers on which it can be tipped, a supporting-cradle comprising curved rails, lateral, confining-plates, antifriction-rollers set on the rails between said plates, and means for tipping the furnace, substantially as and for the purposes described.

In testimony whereof we have hereunto set our hands.

HENRY AIKEN.
FREDERICK W. WOOD.
HARRY H. CAMPBELL.

Witnesses as to signature of Henry Aiken:
G. A. HILLEMAN,
ROME HUTSON.

Witnesses as to signature of F. W. Wood:
H. NELSON CRANE,
CHARLES F. OWINGS.

Witnesses as to signature of H. H. Campbell:
ARTHUR A. SMITH,
W. S. RUTHERFORD.